(12) United States Patent
Walters et al.

(10) Patent No.: US 8,734,033 B2
(45) Date of Patent: May 27, 2014

(54) OPTICAL MECHANISM WITH INDEXING STAGE WITH AT LEAST ONE FIXED DIAMETER APODIZED APERTURE AND METHOD OF MAKING SAME

(71) Applicant: PPG Industries Ohio, Inc., Cleveland, OH (US)

(72) Inventors: Robert W. Walters, Export, PA (US); Robert H. Tang, Murrysville, PA (US); Kevin W. Seybert, Pittsburgh, PA (US); Forrest R. Blackburn, Monroeville, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 13/792,442

(22) Filed: Mar. 11, 2013

(65) Prior Publication Data

US 2013/0259464 A1 Oct. 3, 2013

Related U.S. Application Data

(60) Provisional application No. 61/616,152, filed on Mar. 27, 2012.

(51) Int. Cl.
*G03B 9/04* (2006.01)
*G02B 5/22* (2006.01)
*B05D 5/06* (2006.01)
*B29D 11/00* (2006.01)
*G02B 5/00* (2006.01)
*G02B 5/20* (2006.01)
*G02B 1/10* (2006.01)

(52) U.S. Cl.
CPC *G03B 9/04* (2013.01); *G02B 5/005* (2013.01); *G02B 5/205* (2013.01); *G02B 1/105* (2013.01); *B29D 11/0073* (2013.01); *B29D 11/00865* (2013.01); *B05D 5/06* (2013.01)
USPC ........... 396/505; 359/739; 359/888; 427/164; 264/1.7

(58) Field of Classification Search
CPC ............ G03B 9/02; G03B 9/04; G02B 5/005; G02B 1/105
USPC .......... 396/505, 507; 359/738, 739, 885, 888; 427/164; 264/1.7
See application file for complete search history.

(56) References Cited

U.S. PATENT DOCUMENTS

| 4,030,817 A | 6/1977 | Westell |
| 5,260,727 A | 11/1993 | Oksman et al. |
| 5,662,706 A | 9/1997 | Legerton et al. |

(Continued)

*Primary Examiner* — WB Perkey
(74) *Attorney, Agent, or Firm* — Deborah M. Altman

(57) ABSTRACT

An optical mechanism for a camera having a camera aperture includes an indexing stage movable between at least two distinct positions. At least a first fixed diameter apodized aperture is mounted on the stage and configured to be aligned with the camera aperture in one of the distinct positions of the indexing stage, and wherein the first fixed diameter apodized aperture is not aligned with the camera aperture in the other of the distinct positions of the indexing stage. The stage can include multiple fixed diameter apodized apertures of distinct effective diameters each of which can be selectively aligned with the camera aperture. The mechanism includes an actuator for moving the stage between each of said distinct positions. Methods for mass producing the fixed diameter apodized aperture are disclosed using dye diffusion into optical elements via various methods, and various casting and molding formation techniques.

52 Claims, 7 Drawing Sheets

(56) References Cited

U.S. PATENT DOCUMENTS

| | | | |
|---|---|---|---|
| 5,905,561 A * | 5/1999 | Lee et al. | 623/6.31 |
| 5,965,330 A | 10/1999 | Evans et al. | |
| 6,433,043 B1 | 8/2002 | Misura et al. | |
| 6,621,616 B1 | 9/2003 | Bauer et al. | |
| 7,585,122 B2 | 9/2009 | Eromäki | |
| 7,768,600 B2 * | 8/2010 | Kaihoko et al. | 349/106 |
| 7,929,220 B2 | 4/2011 | Sayag | |
| 2002/0028077 A1 * | 3/2002 | Lo | 396/505 |
| 2004/0021758 A1 * | 2/2004 | Miyazaki et al. | 347/106 |
| 2005/0084774 A1 * | 4/2005 | Katsuragi et al. | 430/7 |
| 2005/0185242 A1 * | 8/2005 | Modavis | 359/227 |
| 2007/0139792 A1 | 6/2007 | Sayag | |
| 2008/0198482 A1 | 8/2008 | Zalevsky | |
| 2009/0323204 A1 * | 12/2009 | Huang | 359/738 |
| 2010/0134866 A1 | 6/2010 | Foller et al. | |
| 2013/0259464 A1 * | 10/2013 | Walters et al. | 396/483 |

* cited by examiner

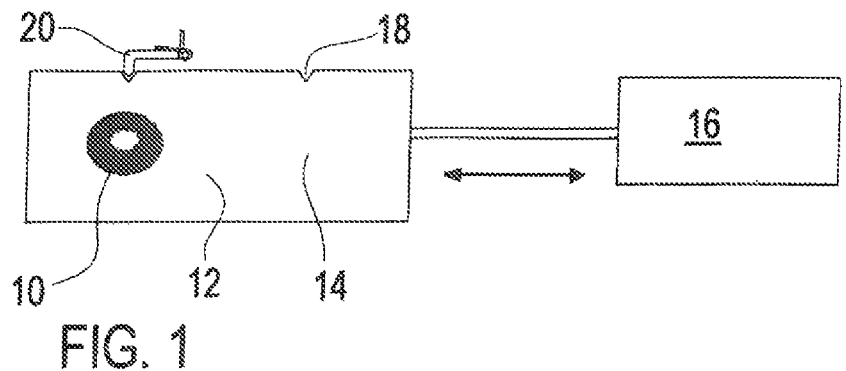
FIG. 1
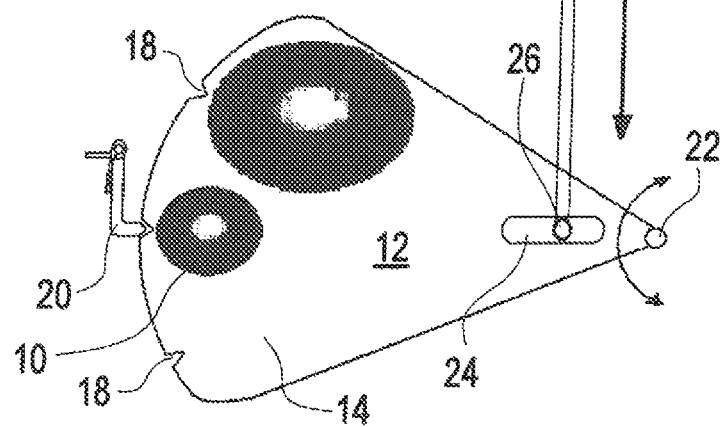
FIG. 2
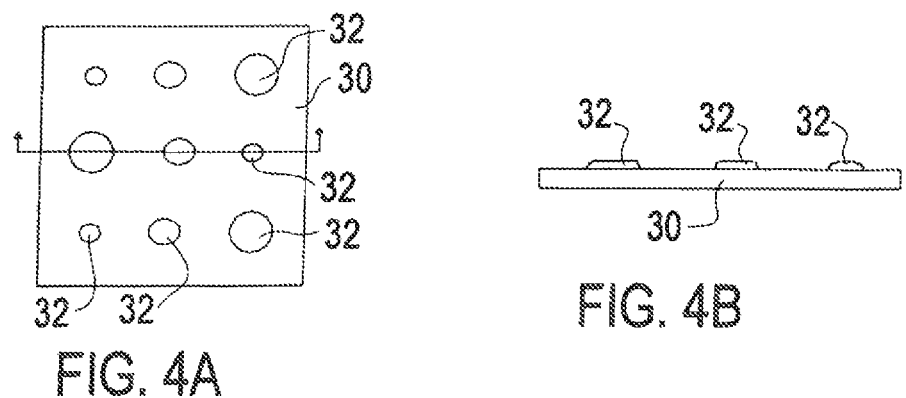
FIG. 4A
FIG. 4B

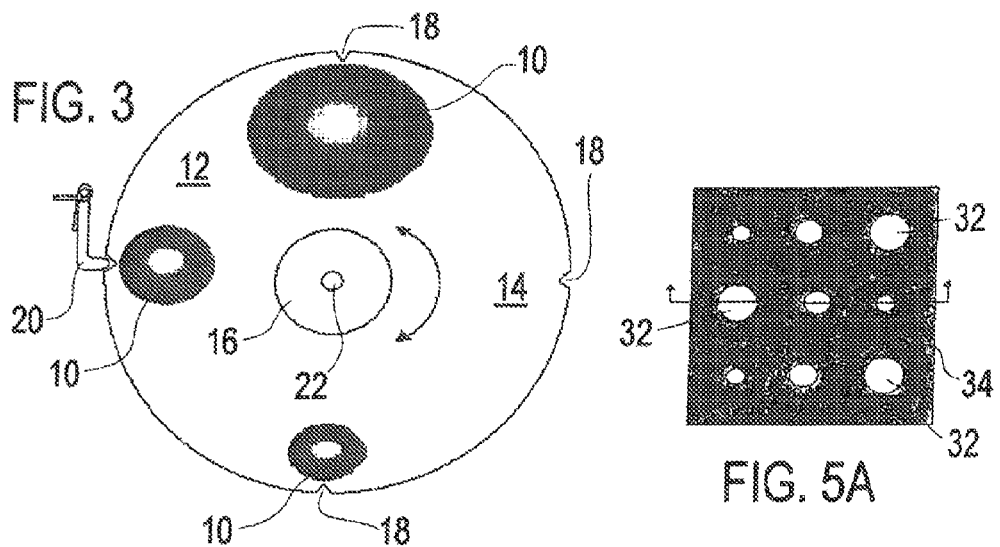
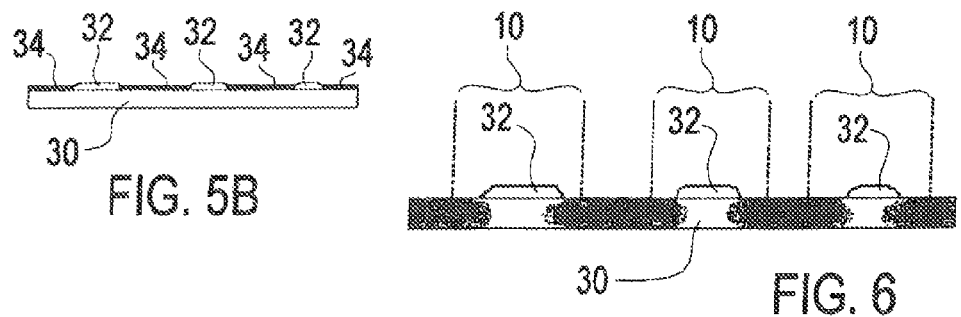
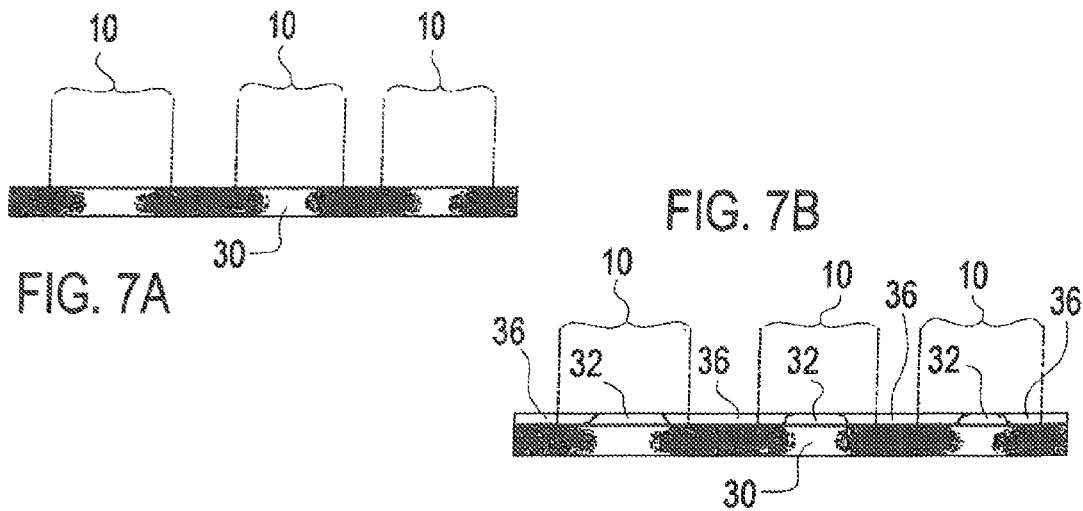

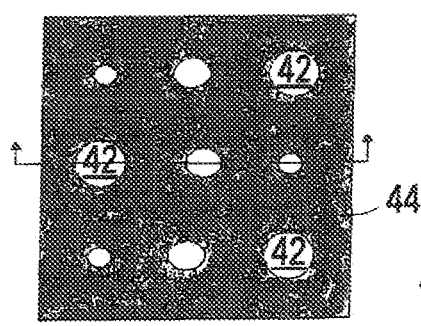
FIG. 8A
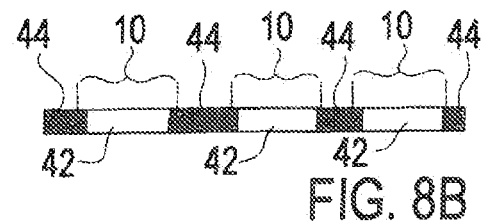
FIG. 8B
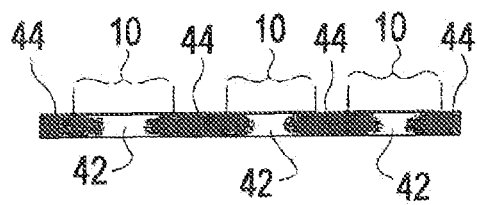
FIG. 8C
FIG. 9A
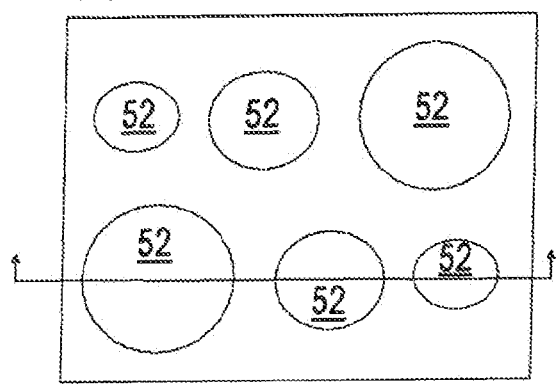
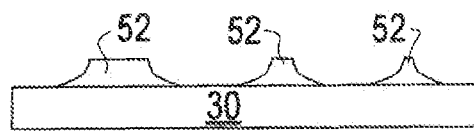
FIG. 9B
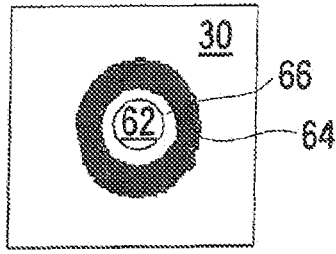
FIG. 11A
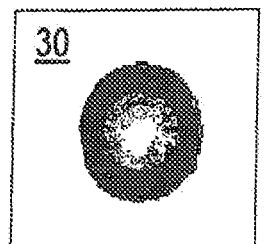
FIG. 11C
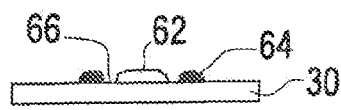
FIG. 11B
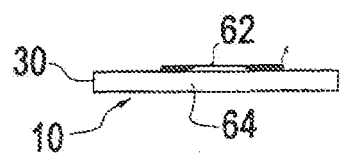
FIG. 11D

OPTICAL MECHANISM WITH INDEXING STAGE WITH AT LEAST ONE FIXED DIAMETER APODIZED APERTURE AND METHOD OF MAKING SAME

CROSS-REFERENCE TO RELATED APPLICATION

This application claims the benefit of U.S. Provisional Patent Application Ser. No. 61/616,152, entitled "An Optical Mechanism with Indexing Stage with at Least One Fixed Diameter Apodized Aperture and Method of Making Same", filed on Mar. 27, 2013.

BACKGROUND OF THE INVENTION

1. Field of the Invention

The present invention relates generally to an optical mechanism with indexing stage with at least one fixed diameter apodized aperture and methods of making same.

2. Description of Related Art

Since essentially the advent of photography adjustable camera settings have been critical in obtaining correctly exposed pictures. These adjustments include "shutter speed" (adjustable exposure time of the "film"), "film speed" (choice of film sensitivity), and lens aperture (adjustable diaphragm in the lens). In addition to affecting the film exposure, these adjustments also provide other essential benefits. For example, the shutter speed adjustment allows the photographer to freeze in time a fast moving scene. The film speed allows the photographer to get the desired grain in the image. The lens aperture adjustment allows the photographer to get the desired depth of field.

In digital cameras, the electronic shutter control (adjustable integration time of the image sensor) often replaces the mechanical shutter but does not eliminate the need for the lens aperture adjustment which remains an indispensable tool, not only to control the amount of light impinging on the imaging sensor but also to achieve the desired depth of field in the associated image.

One common form of lens aperture adjustment for digital cameras is the mechanical iris diaphragm or mechanical iris. The mechanical iris consists of multiple blades which can be moved with respect to each other so as to form an adjustable pseudo-circular polygonal aperture. The blades are often attached to an inner ring and an outer ring moved relative to each other to adjust the mechanical iris. Most film cameras and many digital cameras incorporate a mechanical iris or some other form of lens aperture adjustment (e.g., a rudimentary aperture wheel).

However, there are some notable exceptions: disposable film cameras, very-low-cost digital cameras and many cell phones. The main reason for not using a lens aperture adjustment in these areas is cost. For example, an inexpensive mechanical irise design can be a reasonable component of a digital camera costing possibly less than ½ of 1% of retail price of the total camera unit, but this same inexpensive iris component may cost more than ⅓ of the retail price of a disposable camera or more than ⅓ of the cost of a camera module intended for computer or cellular telephone applications. Thus almost all cell phone cameras (also referred to as cell phone camera modules) do not include a lens aperture adjustment.

Cell phone cameras were, originally, not designed as replacements for traditional cameras. Cell phone camera modules were supposed to produce acceptable images in dim fight conditions without a flash. For this reason, they were fitted with lenses with a large fixed aperture (e.g., f/2.8) to maximize sensitivity at the expense of the depth of field), and relied on the electronic shutter to adjust the exposure level. Consequently these cell phone cameras with no aperture adjustment produce questionable quality images at low-light level due to objectionable shot noise and readout noise and at high-light level due to poor depth of field and reduced sharpness due to lens aberrations.

However due to their enormous popularity (already outselling film and digital cameras), cell phone camera modules are now poised to replace traditional cameras. As a point of reference on popularity, at the end of 2010 there were over 5.3 billion mobile cell phone subscriptions worldwide or over ¾ of the world population, with the Americas listing 880 million subscriptions and Europe listing 740 million subscriptions. Regarding use of cell phone cameras, according to a December 2010 study 52.7% of mobile users in the United States, 57.5% in Europe and 62.9% in Japan used their mobile cellular devices for taking photographs.

Cell phone camera modules need to approach or match traditional camera image quality at a fraction of the cost of a traditional camera. This issue is further aggravated by price pressure and market demand for a larger number of pixels. As semiconductor technology progresses, image sensors get sharper and pixels get smaller thus requiring a lens with a wider aperture in order to maintain the same sensitivity. This requirement conflicts with the need for a sharper lens (since a wider aperture results in greater lens aberrations) and for an increased depth of field (since a wider aperture results in a reduced depth of field).

Two solutions that have attempted to improve cell phone camera modules are the optical auto-focus using a "liquid lens" and the "phase-mask" approach using image processing algorithms. In the case of the optical auto-focus using a liquid lens, the depth of field is not increased. Rather, the focus is simply adjusted for a particular distance. In the case of the phase-mask approach, the focus of the lens is in fact degraded. A phase-mask (placed on one of the lens elements) introduces a relatively constant amount of defocus throughout an extended depth of field. The sharpness is then partially restored by digitally using image processing algorithms. Unfortunately, the sharpness restoration algorithms also introduce a significant amount of noise in the image.

It is clear that none of these solutions really eliminate the need for an inexpensive adjustable lens aperture but there are no suitable technical implementations fulfilling this need for cell phone camera modules. Current mechanical irises are too expensive, too bulky, too fragile, and too power-hungry to satisfy the expected one-billion cell phone camera module market. Mechanical irises also have another serious technical drawback that diffraction through their circular aperture significantly degrades the image sharpness for small aperture settings, e.g., high f numbers such as f/5.6 or higher.

An apodized aperture greatly reduces the detrimental diffraction effects at small aperture sizes (high f numbers such as F/7+) by minimizing sharp edges that cause the diffraction. Others have noted advantages to apodized apertures at larger aperture sizes (F2.8 and above). Apodized apertures become increasingly advantageous as optical sensor pixel density or number increases and/or pixel size decreases.

There have been several proposals in the patent literature that attempt to address these deficiencies such as U.S. Pat. No. 7,585,122, which is incorporated herein by reference, which discloses an electro-mechanical adjustable aperture camera for cell phone applications and the like that is formed of at least two electrodes, and an electrical circuit for applying a voltage to the electrodes in order to create an electric field between the electrodes. U.S. Pat. No. 7,929,220, which is incorporated herein by reference, discloses an adjustable apodized lens aperture constructed using photochromic material. U.S. Pat. No. 6,621,616, which is incorporated herein by reference, discloses certain embodiments providing an electrochromic element for a camera that could be used as a shutter, variable light transmittance filter, and iris simultaneously. U.S. Published Patent Application Serial Number 2010-0134866, which is incorporated herein by reference, teaches the broad concept of an optical element with an electrochromic apodized aperture having variable light transmittance in response to the amplitude of an applied voltage. The broad electrochromic apodized aperture solutions of the prior art such as particularly disclosed in U.S. Pat. No. 6,621,616 and/or U.S. Published Patent Application Serial Number 2010-0134866 may not, due to complexity, be implemented in a manner that is cost effective for efficient large scale manufacturing.

In addition to cost issues there is a need for durability in a cell phone environment as cell phones typically undergo significantly more abuse than conventional digital or film cameras. Thus there is a need for a certain rugged durability in designs intended for cell phone implementation.

There remains a need for cost effective, durable, rugged mechanism for varying the aperture of cameras, such as found in cell phones It is an object of the present invention to develop optical elements incorporating the ability to provide distinct apodized apertures for a camera aperture, and methods of making the same suitable for efficient, effective manufacturing for incorporation into inexpensive camera units such as cell phones.

SUMMARY OF THE INVENTION

The present invention provides an optical mechanism for a camera having a camera aperture, such as found in cell phones. The optical mechanism includes an indexing stage movable between at least two distinct positions. At least a first fixed diameter apodized aperture is mounted on the stage and configured to be aligned with the camera aperture in one of the distinct positions of the indexing stage, and wherein the first fixed diameter apodized aperture is not aligned with the camera aperture in the other of the distinct positions of the indexing stage. An actuator for moving the stage between each of said distinct positions.

The optical mechanism may further include an alignment mechanism, such as a linear or rotary actuator, configured to align the stage in each distinct position. The stage may be configured for linear or rotary movement between each of the distinct positions. The optical element may provide, in a non-limiting example, a resulting F-stop value of the camera of about F2.0 to about F11.0 with the stage the various distinct positions. In one representative example the stage may include at least two, three or four distinct positions for the indexing stage.

The optical mechanism according to one non-limiting embodiment of the invention may be provided wherein each fixed diameter apodized aperture includes dye diffused into an optical substrate. Further each fixed diameter apodized aperture may include a clear topcoat.

Another aspect of the present invention provides a method of making a fixed diameter apodized aperture comprising the steps of: Providing an optical substrate for the apodized aperture; Depositing a mask on the Substrate; Depositing a material containing an optical dye onto the substrate; and Diffusing the optical dye into the optical substrate, wherein the dye will diffuse into the substrate at least partially under the mask when viewed from above the mask and the substrate, forming an apodized aperture.

In accordance with one aspect of the invention, the method of forming a fixed diameter apodized aperture may provide that the effective diameter of the apodized aperture is determined by the effective diameter of the mask and the level of diffusion of the dye. The mask may be a substantially circular mask which is generally centered on the apodized aperture and may be an optical clear coat. Further the mask may form part of the apodized aperture.

The method of forming a fixed diameter apodized aperture according to the present invention may further include a planarizing step, wherein the planarizing step includes the at least partial removal of the mask, or wherein the planarizing step includes the addition of a planarizing layer.

The method of forming a fixed diameter apodized aperture according to present invention allows for easy mass production, wherein a plurality of masks are applied to a single optical substrate for simultaneously forming multiple apertures.

A method of making a fixed diameter apodized aperture according to another aspect of the present invention comprises the steps of: Providing an clear optical substrate for the apodized aperture, Providing a dye containing optical substrate for the apodized aperture surrounding the clear optical substrate for the apodized aperture; and Diffusing the optical dye from the dye containing optical substrate into the clear optical substrate forming an apodized aperture.

A method of making a fixed diameter apodized aperture according to another aspect of the present invention comprises the steps of: Providing an clear optical substrate for the apodized aperture having radially outwardly diverging sides from the top of the clear optical substrate to the bottom thereof, and Casting a dye containing optical substrate for the apodized aperture surrounding the clear diverging side optical substrate for the apodized aperture.

A method of making a fixed diameter apodized aperture according to another aspect of the present invention comprises the steps of: Providing an clear optical substrate for the apodized aperture, Providing an dye containing optical substrate for the apodized aperture surrounding the clear optical substrate for the apodized aperture; and Simultaneously providing the clear optical substrate and the dye containing optical substrate in a manner allowing for diffusing the optical dye from the dye containing optical substrate into the clear optical substrate forming an apodized aperture These and other advantages of the present invention will be clarified in the detailed description of the preferred embodiments taken together with the attached figures wherein like reference numerals reference like elements throughout.

BRIEF DESCRIPTION OF THE DRAWINGS

FIG. 1 schematically illustrates an optical mechanism formed of a two stop indexing stage with a fixed diameter apodized aperture in accordance with one aspect of the present invention;

FIG. 2 schematically illustrates an optical mechanism formed of a three stop indexing stage with a pair of distinct fixed diameter apodized apertures in accordance with another aspect of the present invention;

FIG. 3 schematically illustrates an optical mechanism formed of a four stop indexing stage with three distinct fixed diameter apodized apertures in accordance with another aspect of the present invention;

FIG. 4a is a schematic top plan view of a series of hard coat masks on an optical substrate for forming a series of apodized apertures of distinct opening sizes with a diffusion method according to one aspect of the present invention;

FIG. 4b is a schematic sectional view of a series of hard coat masks on the optical substrate of FIG. 4a;

FIG. 5a is a schematic top plan view of a dye applied to the optical substrate having the series of hard coat masks of FIGS. 4a and b during the diffusion forming of a series of apodized apertures of distinct opening sizes according to one aspect of the present invention;

FIG. 5b is a schematic sectional view of the dye applied to the optical substrate having the series of hard coat masks of FIG. 5a;

FIG. 6 is a schematic sectional view of the diffused dye within the optical substrate having the series of hard coat masks following the dye application of FIGS. 5a and 5b;

FIGS. 7a and b are schematic sectional views of the diffused dye within the optical substrate of FIG. 6 following distinct planarizing options;

FIG. 8a is a schematic top plan view of an initial optical substrate configuration for forming a series of apodized apertures of distinct opening sizes with a diffusion method according to another aspect of the present invention;

FIG. 8b is a schematic sectional view of initial optical substrate configuration for forming a series of apodized apertures of FIG. 8a;

FIG. 8c is a schematic sectional view of the diffused dye within the optical substrate following the set up of FIGS. 8a and 8b;

FIG. 9a is a schematic top plan view of an initial optical substrate configuration for forming a series of apodized apertures of distinct opening sizes with a molding method according to another aspect of the present invention;

FIG. 9b is a schematic sectional view of initial optical substrate configuration for forming a series of apodized apertures of FIG. 9a;

FIG. 10b is a schematic sectional view of the dye and optical substrate configuration for forming a series of apodized apertures of FIG. 10a;

FIG. 10d is a schematic sectional view of the dye and optical substrate configuration for forming a series of apodized apertures slightly modified from the configuration of FIG. 10a;

FIG. 11a is a schematic top plan view of an initial optical substrate configuration for forming an apodized aperture with a co-molding or printing method according to another aspect of the present invention;

FIG. 11b is a schematic sectional view of initial optical substrate configuration for forming an apodized aperture of FIG. 11a;

FIG. 11c is a schematic top plan view of the integrated optical substrate configuration for forming an apodized aperture with the co-molding or printing method of FIGS. 11a and b;

FIG. 11d is a schematic sectional view of the integrated optical substrate configuration for forming an apodized aperture of FIG. 11c;

DETAILED DESCRIPTION OF THE INVENTION

Figure 10A:
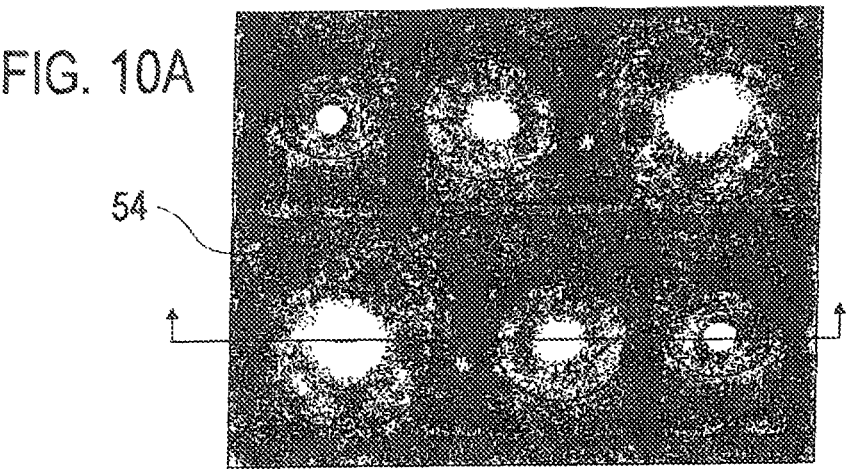
FIG. 10a is a schematic top plan view of a cast dye on the optical substrate configuration of FIGS. 9A and b.

It is noted that, as used in this specification and the appended claims, the singular forms "a," "an," and "the" include plural referents unless expressly and unequivocally limited to one referent. The various embodiments and examples of the present invention as presented herein are each understood to be non-limiting with respect to the scope of the invention.

The present invention provides an optical mechanism for a camera having a camera aperture, three embodiments of which are schematically illustrated in FIGS. 1-3 described in further detail below. The optical mechanism of each embodiment includes an indexing stage 12 movable between at least two distinct positions. Any number of distinct positions can be incorporated into the stage 12 depending upon the distinct optical properties desired, one of which is provided at each distinct stage position. The stage 12 as schematically shown herein can be formed out of optically clear material. Alternatively, a non-optically clear material, e.g. metal, may form the stage 12, and in such case the distinct positions of the stage 12 that are aligned with the camera aperture may include openings there through and/or the apodized apertures 10 could be formed as insert windows in the stage 12.

The present description is primarily discussing distinct apodized aperture 10 opening sizes resulting in distinct effective aperture openings for the camera aperture, such as allowing the camera to efficiently and effectively move between any desired f/stop range, for example an F/2.0 size and an F/11.0 size. However the apodized apertures 10 of the present invention can be integrated with optics such as magnification lens (e.g., 2x zoom lens) and/or filters (e.g., color filters) to provide further distinct desired properties at each distinct position. The formation of lens and or filters, per se, is not discussed further in this description in detail.

At least a first or one fixed diameter apodized aperture 10 is remounted on the stage 12 and configured to be selectably aligned with the camera aperture in one of the distinct positions of the indexing stage 12. A plurality of distinct fixed diameter apodized apertures 10 may be provided in certain embodiments described below. The present disclosure illustrates distinct apodized apertures 10 having varied fixed diameters; however it is possible to have distinct apertures 10 with identical fixed diameters with the incorporation of distinct optics. For example, two distinct apodized apertures 10 on the stage 12 may have the same effective fixed diameter (e.g., providing for illustrative purposes an effective F/6 opening for the camera aperture) with one including a zoom lens optic (e.g. 4× zoom lens), whereby the two same sized apodized apertures 10 are distinct providing a 4× zoom with effective F/6.0 size and effective F/6.0 size with no optic.

Additionally the distinct apertures 10 are described herein and believed to be the most efficient for forming a stage 12 according to the present invention, but nothing prevents the operation of the stage 12 according to the present invention if one or more of the distinct apodized apertures 10 is/are repeated on the stage 12. For example in a stage 12 design with a large number of distinct apertures (e.g., 10+) the optical mechanism may be more efficient if apodized aperture 10 for the most common setting is repeated at several spaced locations along the stage 12. In general it is believed it will be most effective and efficient if distinct apertures 10 are only present once on the stage 12 as shown in the following representative examples.

As should be apparent from the following description each fixed diameter apodized aperture 10 on stage 12 is selectably not aligned with the camera aperture in selected other of the distinct positions of the indexing stage 12.

The optical mechanism of the invention generally includes an actuator 16, such as an electric linear or rotary actuator, for moving the stage 12 between each of the distinct positions. It is possible that the optical mechanism can have a manually operated actuator in place of automated electric linear or rotary actuators, however is presumed that in most desired applications of the optical mechanism of the present invention the automated actuator 16 will be desired.

Turning to the example of the optical mechanism of the invention specifically illustrated in FIG. 1, this figure schematically illustrates a two stop indexing stage 12 with a single apodized aperture 10 of fixed opening associated with one effective opening size when aligned with the camera aperture and an open space 14 that is associated with the cameras existing aperture size when the open space 14 is aligned with the camera aperture. Using the open space allows the stage 12 to utilize the natural camera opening as one effective F/stop size for the camera. The open space 14 can be formed as an empty space as shown, provided the stage 12 is formed of optically clear material. If the stage 12 is formed of a non-optically clear material, e.g., a metal substrate, then the open space 14 can be formed as an opening in the stage 12, or as an optically clear window.

In the representative two stop or two position stage 12 of FIG. 1 a linear movement mechanism 16, such as a solenoid can index the stage 12 between two positions, one of which provides that the single aperture 10 is aligned with the camera opening and the open space 14 is not for a first effective camera aperture opening, and a second one of which provides that the single aperture 10 is not aligned with the camera opening and the open space 14 is aligned with the camera opening for a second effective camera aperture opening (which is equal to the natural camera opening).

In the optical mechanism of the invention and as schematically shown in FIG. 1 the stage can include alignment mechanisms 18 associated with mechanical stops, such as spring biased pivoted detent members 20 as shown. The alignment mechanisms can assure that the stage 12 is properly positioned relative to the camera for each of the distinct positions of the stage 12.

FIG. 2 schematically illustrates a three stop indexing stage with a pair of apodized apertures 10 of distinct sized fixed openings and an open space 14 that is associated with the cameras existing aperture size. This embodiment shows three positions that allow the effective opening of the camera to range from the natural camera opening through two alternative distinct effective opening sizes. Thus, as illustrated, there are exactly two fixed diameter apodized apertures 10 mounted on the indexing stage and wherein the optical element may, for example, provide a resulting F-stop value of the camera of about F/2.0 to about F/4.0 with the stage in the one of the distinct positions, a resulting F-stop value of the camera of about F/4.5 to about F/7.5 with the stage in a second of the distinct positions and an F-stop value of about F/8.0 to about F/11.0 with the camera aperture in the third of the distinct positions. The particular effective aperture opening sizes selected for each position may be selected as desired and these representative examples are intended only to demonstrate or suggest the wide versatility of the present invention.

The representative embodiment of FIG. 2 includes an automated linear movement mechanism 16, such as a solenoid that can index the stage 12 between positions in which one of the apertures 10 is aligned with the camera opening or the open space 14 is aligned with the camera opening. The stage 12 can also include alignment mechanisms 18 associated with mechanical stops, such as spring biased pivoted detent member 20 as shown. The stage 12 is shown as a pivoting member mounted on pivot 22 with slot 24 engaging a pin 26 of the actuator 16 whereby the rotary motion of the stage 12 accommodates and is driven by the linear actuator 16.

FIG. 3 schematically illustrates a representative example of a four stop indexing stage 12 with a set of three distinct apodized apertures 10 of distinct sized fixed openings and an open space 14 that is associated with the cameras existing aperture size. A rotary movement mechanism 16, such as a rotary motor, can index the stage 12 between positions in which one of the apertures 10 is aligned with the camera opening or the open space 14 is aligned with the camera opening. The stage 12 can include alignment mechanisms 18 associated with mechanical stops, such as spring biased pivoted detent member 20 as shown and described above. The stage 12 is shown as a rotating member mounted on a hub or pivot 22.

The illustrated examples show a linear moving stage 12 with linear actuator 16 in FIG. 1, a rotary moving stage 12 with a linear actuator 16 in FIG. 2 and a rotary moving stage 12 with a rotary actuator 16 in FIG. 3. Any of these designs can include a number of apodized apertures 10. The particular movement mechanism 16 and movement of the stage 12 are likely determined by the space limitations in the final device and these are merely representative examples.

The optical mechanism according to one non-limiting embodiment of the invention may be provided wherein each fixed diameter apodized aperture 10 includes dye diffused into an optical substrate 30. Further each fixed diameter apodized aperture may include a dear topcoat 32 and 36 described below.

Another aspect of the present invention provides a method of efficiently and effectively making, e.g., mass producing, a fixed diameter apodized aperture 10 as is schematically shown in FIGS. 4A-6, and possibly including a planarizing step shown in FIGS. 7a and b. The method, as described further below comprising the steps of: providing an optical substrate 30 for the apodized aperture 10; Depositing a mask 32 on the substrate 30; Depositing a material 34 containing an optical dye onto the substrate 30; and Diffusing the optical dye into the optical substrate 30, wherein the dye will diffuse into the substrate 30 at least partially under the mask 32 when viewed from above the mask 32 and the substrate 30, forming an apodized aperture 10.

The substrate 30 can be formed of a wide variety of known optical materials in which the selected dye can diffuse. A non-exclusive list of materials for the optical substrate 30 includes UV curable (cationic polymerizable, anionic polymerizable, free radical) materials, Thermally curable (thermosets—free radical, condensation polymers, alcohol/amine+isocyanates, etc.) materials, non curable polymers (thermoplastics)—Siloxanes, acrylates, methacrylates, polyurethanes, polyureas, PMMA, polystyrene, cyclic olefin polymer. The mask 32 may be formed of a similar listing of materials however the material must be selected to act as a barrier to dye inhibition whether it is based upon permeability of the coating via solubility or diffusion coefficients. In effect the materials suitable for the mask 32 and the substrate 30 are more or less the same list, but with control of cross-link density/flexibility, and associated parameters then one can make the materials more amenable to diffusion for the substrate 30 or less (or effectively non-existent) for the mask 32.

The method of forming a fixed diameter apodized aperture 10 may provide that the effective diameter of the apodized aperture 10 is determined by the effective diameter of the mask 32 and the level of diffusion of the dye from material 34. In most embodiments the mask 32 may be a substantially circular mask 32 which is generally centered on the apodized aperture 10 and may be formed as an optical clear coat. Further the mask 32 may form part of the final apodized aperture 10.

Turning to the figures, FIGS. 4a and b schematically illustrate the application of clear hard coat masks 32 onto an optical substrate 30 for forming a series of apodized apertures 10 of distinct opening sizes. In the schematic illustration nine apertures 10 of three distinct sizes are formed on the substrate 30 with a diffusion method according to the present invention. Each substrate need not have distinct sizes as it may be more efficient to form each substrate 30 with identical sized apertures 10. The clear coat or mask 32 can be deposited via one or more dispensing nozzles which can also be called printing heads. The dispensing nozzles for the clear coat 32 may or may not move relative to the substrate 30. For example the system could employ an indexing work piece holder or a conveyor that moves the substrate 30 relative to one or more nozzles. Alternatively print heads forming the dispensing nozzles for the mask 32 may be provided on an XY indexing slide to move over a stationary substrate 30. The deposition will control the size of the mask 32. The clear coat or mask 32 could also be vapor deposited (or other deposition method) silicon dioxide (glass). There are numerous effective and cost efficient methods for depositing the masks 32 onto the substrate 30, and these are merely representative examples.

FIGS. 5a and b schematically illustrate the application of a dye layer 34 on the clear hard coat masked optical substrate 30 of FIGS. 4a and b. The dye layer 34 can be applied by any known process such as spraying, pouring, or other know application techniques. A wide variety of known dyes may be employed in the dye containing layer 34. Essentially, any dye or group of dyes that absorb enough light from 425 to 650 nm so as to remove unwanted light. Suitable examples are known to those of ordinary skill in the art and may be references, for example, in "The Sigma-Aldrich Handbook of Stains, Dyes and Indicators, Floyd Green, 1990, Aldrich Chemical Company". This particular known reference has a huge selection of suitable dyes and dye families.

Following depositing of the layer 34 the system is cured to allow the dispersion or diffusion of the dye in the layer 34 into the substrate 30. FIG. 6 illustrates the dispersion of the dye of FIGS. 5a and b into the optical substrate forming the apodized apertures 10. As illustrated the inclusion of the masks 32 allow for formation of the apodized apertures 10 in the substrate. At this point the apertures 10 can be cut out of the substrate 30 as would be known in the art using conventional cutting and edge polishing techniques.

Prior to separation of the individual apertures 10 from the substrate 30 of FIG. 6 there may be subsequent surface processing, such as planarizing the apertures 10. FIG. 7a illustrates the apodized apertures 10 of FIG. 6 further including planarizing step such as grinding and/or lapping effectively removing the hard coat masks 32 from the aperture 10. Alternatively FIG. 7b illustrates the apodized apertures 10 of FIG. 6 further including a planarizing step of adding a planarizing layer 36. The planarizing layer 36 would be formed of known acceptable optical material similar to the substrate 30 and mask 32. The layer 36 may be applied in any known fashion; such as for example, spin coating. The individual apertures 10 may be removed or separated from the residual portions of the substrate 30 (and layer 36 if present) following final surface processing.

Instead of separating the apertures 10 into individual components or apertures 10 and attaching these to a stage 12, the substrate 30 may be formed of material of stage 12 whereby the apertures 10 are thereby formed directly on stage 12. For example, FIG. 4 could show the formation of three linear actuated stages 12 each stage 12 having four positions and three apertures 12. The three stages 12, following the formation of the apertures 10 thereon, need only be separated and alignment mechanisms 18 added to complete the assembly. Forming the substrate 30 as the material forming the stage(s) 12 may thus offer manufacturing advantages requiring that the apertures 10 are spaced properly on the substrate 30. Alternatively there may be cost savings associated with mass production of numerous apertures 10 with no spacing restrictions, and which individual apertures 10 are later attached to a distinct stage 12.

FIGS. 8a and 8b schematically illustrates a set up of another dispersion method according to the present invention for forming a series of apodized apertures of distinct opening sizes. This alternative "lateral" dispersion method begins with provision of a substantially clear optical substrate 42 forming a central portion of each aperture 10 and a surrounding dye inclusive containing optical substrate 44. The suitable substrates material for substrates 42 and 44 and dyes are the same as described above in connection with substrate 30 and the dye in layer 34 discussed above. The provision of the substrates as shown in FIGS. 8a and 8b may be through a number of assembly techniques, one of which is to die cut openings in layer 44 and inserts from a layer of material 42 and place the inserts of material 42 in the openings in the material 44. Other acceptable mass production techniques can be implemented.

Following the provision of the components (adjacent layers 42 and 44) of the aperture 10 as shown in FIGS. 8a and b, the method includes diffusing the optical dye from the dye containing optical substrate 44 into the clear optical substrate 42 forming an apodized aperture 10. FIG. 8c illustrates the dispersion of the dye of substrate 44 of FIGS. 8a and b laterally into the optical substrate 42 forming the apodized apertures 10. The apertures 10 need only be separated through conventional techniques. Subsequent processing before separation of the apertures 10 (or after) may also be performed such as adding a planarizing layer or adding an optical layer such as a filter, or other processes as desired.

The present invention further includes a molding or pour casting method of making a fixed diameter apodized aperture shown generally in FIGS. 9a-10d which includes the initial step of providing an clear optical substrate 52 for the apodized aperture 10 having radially outwardly diverging sides from the top of the clear optical substrate 52 to the bottom thereof. The shape may be convex, concave, straight or combinations thereof. A flat topped frusto-conical substrate 52 with concave sides is shown in the figures but a wide variety of shapes may be sufficient. For example a drop shape may be effective and may be economically formed. FIGS. 9a and b schematically illustrates a set up of this pour molding or casting method according to the present invention for forming a series of apodized apertures 10 of distinct opening sizes (six apertures of three distinct sizes in this figure purely as a representation). The method begins with a substantially clear optical substrate 52 forming a central portion of each aperture 10 having sloped sides (concave, convex, linear or combinations thereof) as noted. The substrate 52 may be provided onto a separate base 30 as shown, or may be part of the base 30' in the embodiment described below in connection with FIG. 10d. The materials forming the substrate 52 are the same as described above in connection with substrate 30 or mask 32.

The casting method of FIGS. 9-10 includes the casting or pour-molding of a dye containing optical substrate 54 for the apodized aperture 10 surrounding the clear diverging side optical substrate 52 for the apodized aperture 10. FIGS. 10a and 10b illustrate the addition of the pour cast dye including optical substrate 54 to the base 30 and substrate 52 of FIGS. 9A and b to form the apodized apertures 10 according to the present invention. Again numerous casting techniques may be used including spin coating or the like. In this method the dye need not be dispersed from layer 54 into 52 thus the materials may be effectively formed as the mask layer 32 described above. The sloping sides of the substrate 52 create the apodized effect in the final aperture 10.

The apertures 10 need only be separated through conventional techniques. Subsequent processing before separation of the apertures 10 (or after) may also be performed such as adding a planarizing layer or adding an optical layer such as a filter, or other processes as desired such as removal of base 30. FIG. 10c illustrates the removal of base 30 from the mold formed apodized apertures 10 of FIGS. 10a and b.

Figure 10B:
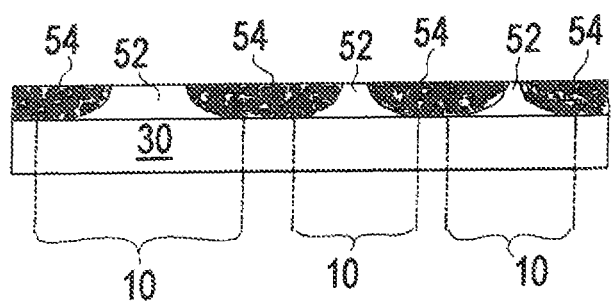
Figure 10C:
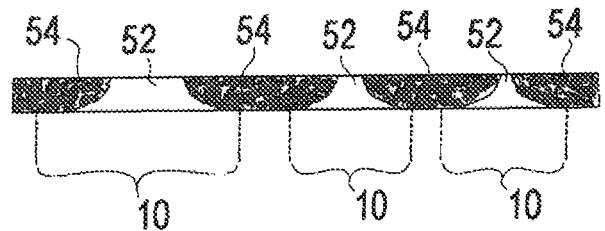
FIG. 10c is a schematic sectional view of the dye and optical substrate configuration for forming a series of apodized apertures of FIGS. 10a and b following a planarizing step.
Figure 10D:
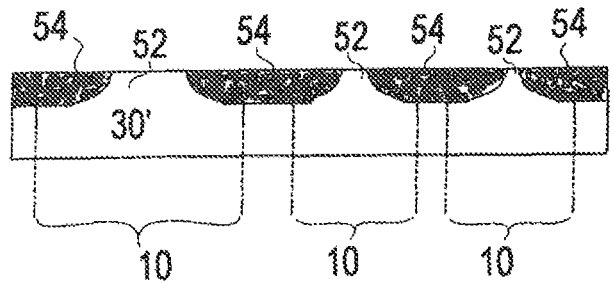

FIG. 10d illustrates an embodiment for casting the apodized apertures 10 according to the present invention similar to FIGS. 10a-b in which the substrates 52 are integral with the base 30'. This may be accomplished by molding of the substrate 52 and base 30', or machining or pressing the substrate shape 52 into the base 30'.

The present invention further includes a co-molding method of making a fixed diameter apodized aperture 10 of the invention. This method is illustrated in FIGS. 11a-d and comprising the steps of: Providing an clear optical substrate 62 for the apodized aperture 10, Providing an dye containing optical substrate 64 for the apodized aperture surrounding the clear optical substrate for the apodized aperture; and Simultaneously providing the clear optical substrate 62 and the dye containing optical substrate 64 in a manner allowing for effectively diffusing the optical dye from the dye containing optical substrate 64 into the clear optical substrate 62 forming an apodized aperture 10.

As with the processes described above the co-molding method of forming a fixed diameter apodized aperture 10 provides that the effective diameter of the apodized aperture 10 is determined by the effective diameter of the clear optical substrate and the level of diffusion. Further as shown in this embodiment as with the other methods described above the clear optical substrate 62 is substantially circular and is generally centered on the apodized aperture 10. However note that any desired shape of apodized aperture could be formed in accordance with the present invention, as dictated by the camera aperture and intended operation of the aperture 10.

The "diffusion" process of the co-molded design of FIGS. 11-a-d can be slightly different than the above as this "diffusion" may be a mixing of the two materials 62 and 64 before they set in the final configuration, Additionally this co-molding may be a casting type mold or through an injection type molding operation.

Specifically for illustration FIGS. 11a-d illustrate a co-molded technique for making an apodized aperture 10 wherein a clear flowable central substrate 62 is placed onto base 30 with an annular flowable dye containing substrate 64 with an initial definition or space 66 there between as shown in FIGS. 11a and b. During setting of the materials 62 and 64 the space 66 is filled with a mixture of the substrates 64 and 62 to form the apodized aperture as shown in FIGS. 11c and d. This co-molding may be accomplished in a variety of methods including use of a pair of movable print heads which are used for simultaneously dispensing the dye containing optical substrate 64 and the clear optical substrate 62. Fast moving print heads may allow for the ring of material 64 to be placed quickly enough to allow for desired mixing. Alternatively a pair of concentric dispensing nozzles may be used for dispensing the dye containing optical substrate and the clear optical substrate.

The apertures 10 need only be separated through conventional techniques. Subsequent processing before separation of the apertures 10 (or after) may also be performed such as adding a planarizing layer or adding an optical layer such as a filter, or other processes as desired Bench Test Examples for Fixed Apodized Aperture 10

Imbibition Resin

The following materials were added to a suitable vessel with an agitator: 4.8 g 1-methyl-2-pyrrolidinone; 9.7 g tetrahydrofurfuryl alcohol; 11.4 g diethylene glycol dimethyl ether; 6.5 g propylene glycol butyl ether; 4.0 g hydroxypropylcellulose. These materials were mixed for about 2 hours till the solution was homogenous Dye Imbibition Resin The following materials were added to a suitable vessel with an agitator: 10.0 g Imbibition Resin; 0.30 g Sudan black. The mixture was stirred at 60° C. for 60 minutes.

Monomer Formulation

The following materials were added to a suitable vessel with an agitator: 4.0 g BPA 2EO DMA; 6.0 g BPA 30EO DMA; 0.015 g AIBN. The mixture was stirred for 2 hours to dissolve the AIBN. The solution was then degassed under reduced pressure in a vacuum chamber.

Masking Solution

The following materials were added to a suitable vessel with an agitator: 32.4 g Gamma-glycidoxypropyltrimethoxysilane; 345.5 g methyltrimethoxysilane; 292 g deionized water (1 g HNO3 to 7 KG water); 228 g 1-methoxy-2-propanol; 0.45 g TMAOH (25% tetramethylammonium hydroxide solution in MeOH); BYK 306=2.0 grams. The solution was stirred till homogenous.

Preparation of Polymeric Substrate

Glass molds were assembled using a 500 um plastic gasket between two glass microscope slides. The mold was filled with the monomer formulation using a 3 ml syringe to inject about 1 ml of monomer formulation. The monomer formulation was cured at 120° C. for 2 hours and then cooled to room temperature. The clear 2" by 3" polymeric film was then separated from the glass slides. The Masking Solution was applied as separate droplets on the clear polymeric substrate using a VCA 2500 VE video contact angle system from AST Products. Three sheets were each printed with different droplet sizes (0.3, 0.5, and 0.7 µL) in 5 rows of 3 droplets. The droplets of Masking Solution were cured for 60 min at 100° C.

About 1.5 ml of the Dye Imbibition Resin was applied to the films by spin coating at 1200 RPM for 15 seconds. The coated samples were heated for 60 min at 135° C. The resulting films were washed with soap and water and then the Masking Solution droplets were removed by immersing the films in 10 weight percent NaOH solution with sonication and heating to 60° C. The films were cut into strips (3 apertures per strip) and then the diffusion process was continued for different lengths of time as reported in the examples to vary the diffusion rate and the size of the apodized apertures.

Results—Apodization:

The apertures chosen for imaging did not demonstrate apparent image distortion when a 1×1 mm grid was viewed through the aperture using an Olympus SZH10 zoom stereo microscope. The settings were 1.5× objective and 2.0× on the zoom. Two transfer optics 2.5× and 0.3× in the light path were used to accommodate the ⅔" camera sensor resulting in a field of view of 4.25 mm×3.5 mm through the camera.

Microscope Images:

Images were acquired using an AVT Stingray 145C digital camera mounted (CMount) on an Olympus SZH zoom stereo microscope resulting in a magnification of 45×. The sample was held in place with a custom holder with a 5.1 mm aperture to cut out stray light from the sides. The microscope iris was set to 6 to get the greatest depth of field view. The camera was set up using AVTs software included with the camera with the following settings: with exposure time=115 ms (50 microseconds*2300 steps), white balance was fixed, high signal to noise ratio set to ON with 8 images averaged per acquisition—RAW16 format. The Olympus microscope and eyepieces were covered with light blocking material from ThorLabs to remove stray light, particularly for the dark acquisition. Dark acquisition was collected by closing the manual shutter between the light source and the sample on the microscope stage.

The data was processed using customized IGOR PRO™, available from WaveMetrics routines.

Widths of the fixed apodized iris' were obtained as follows. The intensity Profiles were extracted either horizontally or vertically. The dark level was subtracted out of this information and some "boxcar like" averaging (8 pixels) was performed to improve the signal to noise. The profiles for the green response of the image sensor were curve fit with a Gaussian function. The Gaussian width from the curve fit in Igor is square root of 2 (SQRT(2)), i.e., 1.4142 times the standard deviation. To get a beam waist, the width is divided by 1.4142 and then multiplied by 2.

Transmission profile of the green response of the image sensor was calculated by taking a reference image of a glass slide instead of a polymer film, a dark image (manual shutter closed) and the sample image (sample in place) for each sample. The transmission profile of the green response of the image sensor was calculated using the following formula and the data across the profile of the image (see equation below). The transmission image was calculated and the transmission green profile was extracted along the same coordinates as the green counts profile.

Transmission=(Sample Image−Dark Acquisition)/ (Reference Image−Dark Image)

Figure 12:
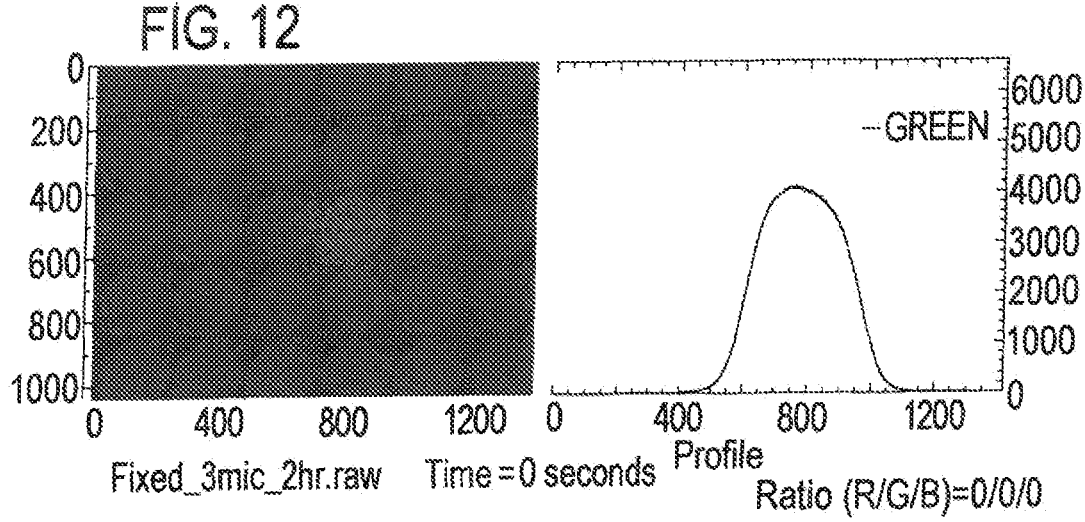
FIG. 12 includes an image of an apodized aperture adjacent a green counts profile on the right side of the figure illustrating results of testing of example 1 of the bench tests of the test apodized aperture formed according to the present invention.
Figure 13:
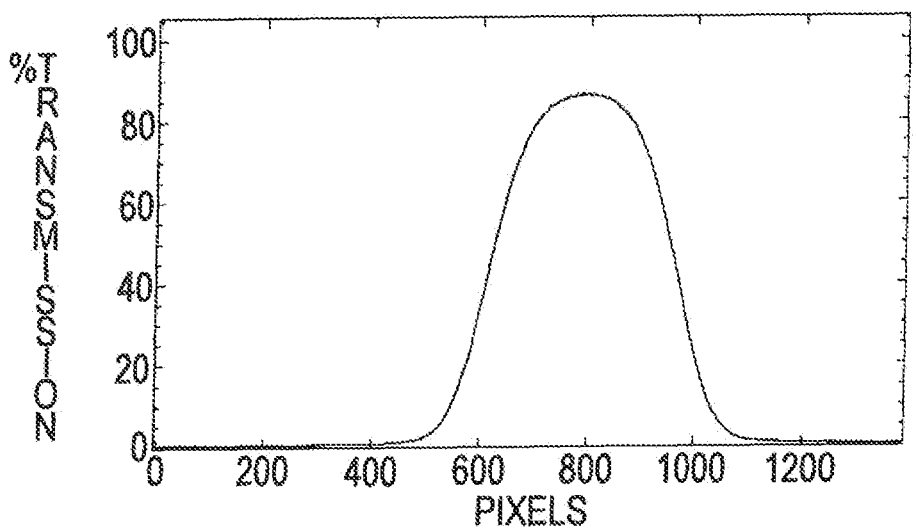
FIG. 13 is a transmission profile of the test aperture of FIG. 12.

Example 1 (2010-FRB-61) represented in FIGS. 12-13

Image of apodized part is on the left side of the figure with Green counts profile on the right side of FIG. 12. Droplet Size—0.3 microliters—Imbibition Time—2 hours. Beam waist for green response (counts) was 0.88 mm.

The beam waist was obtained by curve fitting the counts profiles with a Gaussian function in Igor Pro. The Gaussian width parameter was converted to a beam waist by multiplying the Gaussian width by 2/SQRT(2). This provided the beam waist in pixels. The pixels were converted to mm by using a 1×1 mm calibrated grid and calculating the number of pixels/millimeter (303 pixels/mm in this case). Transmission profile across the part is shown in FIG. 13.

Figure 14:
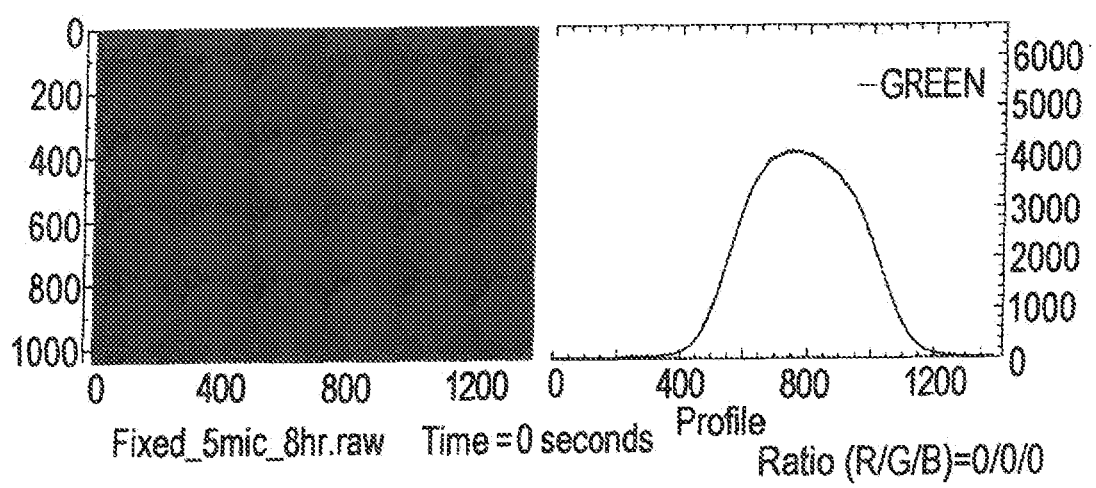
FIG. 14 includes an image of an apodized aperture adjacent a green counts profile on the right side of the figure illustrating results of testing of example 2 of the bench tests of the test apodized aperture formed according to the present invention.
Figure 15:
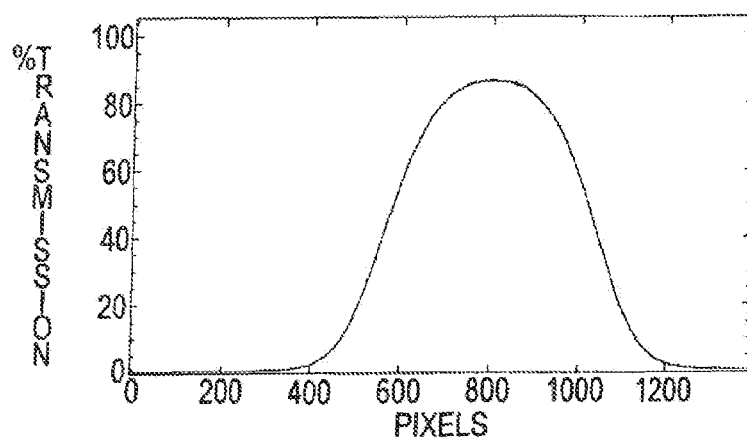
FIG. 15 is a transmission profile of the test aperture of FIG. 14.

Example 2 see FIGS. 14-15

Figure 16:
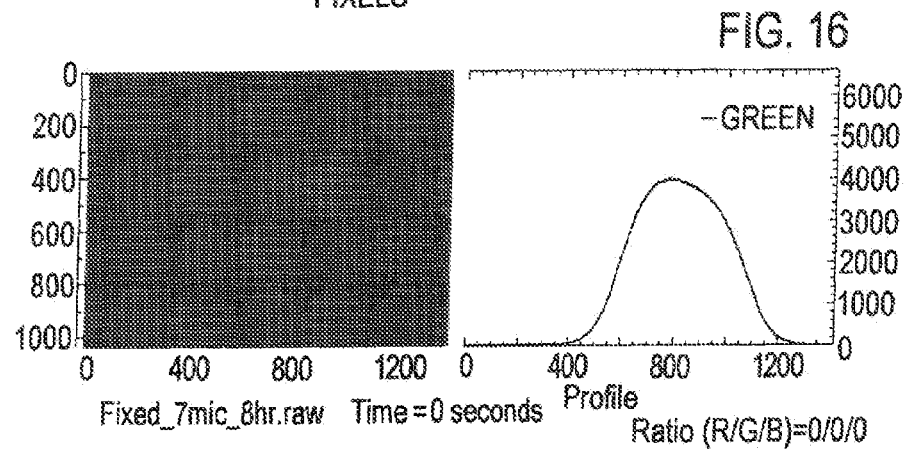
FIG. 16 includes an image of an apodized aperture adjacent a green counts profile on the right side of the figure illustrating results of testing of example 3 of the bench tests of the test apodized aperture formed according to the present invention.
Figure 17:
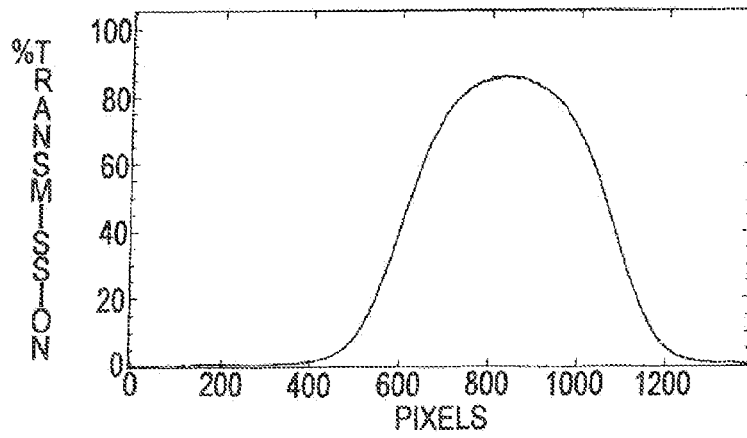
FIG. 17 is a transmission profile of the test aperture of FIG. 14.

Droplet size—0.5 microliters. Imbibition time—8 hours. Beam waist for green response (counts) was 1.21 mm. Transmission profile across the part shown in FIG. 15:

Example 3 shown in FIGS. 16-17

Droplet size—0.7 microliters. Imbibition time—8 hours. Beam waist for green response (counts) was 1.21 mm. Transmission profile across the part shown in FIG. 17.

Figure 18:
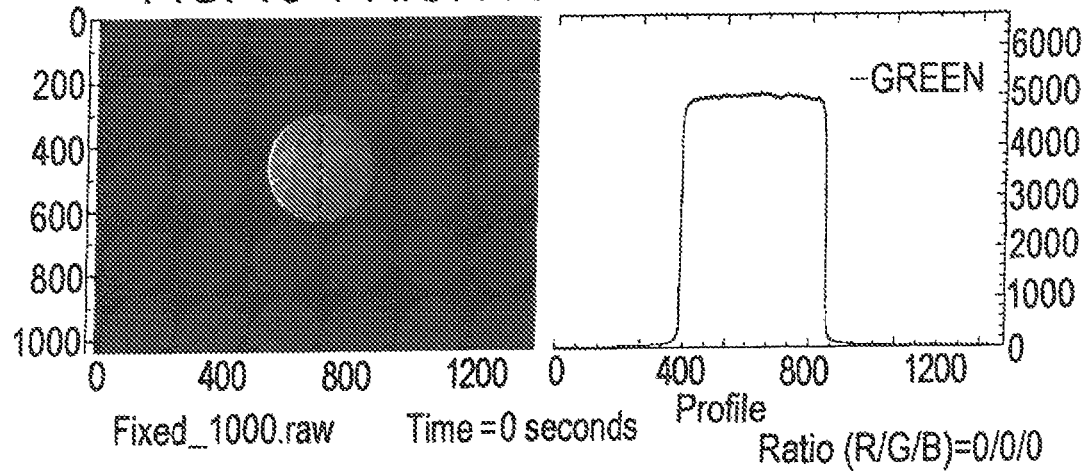
FIGS. 18 and 19 are illustrations of results of testing a prior art pin hole aperture.
Figure 19:
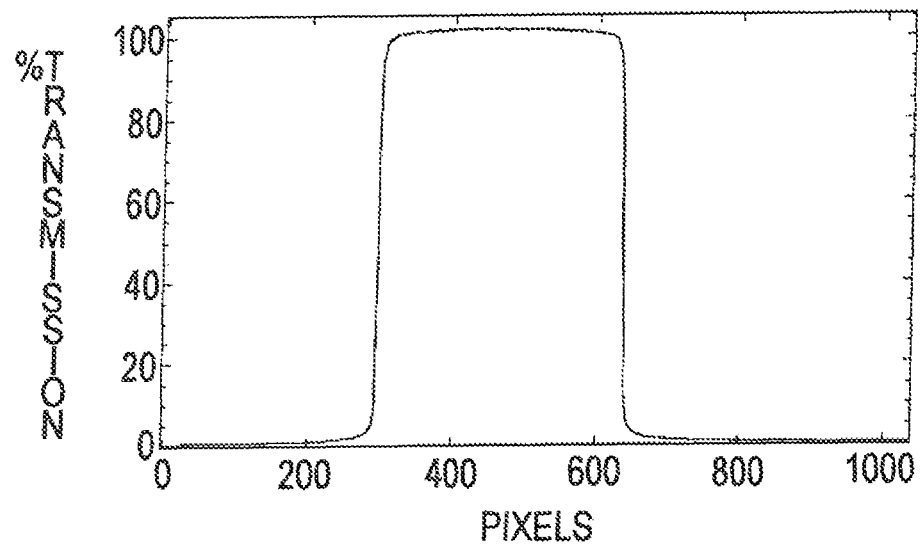

Comparative Example of a "normal" non-apodized iris: 1000 micron diameter pinhole aperture (Edmund optics) shown in FIGS. 18 and 19. Transmission profile across the part shown in FIG. 19.

The present invention has been described with reference to specific details of particular embodiments thereof. It is not intended that such details be regarded as limitations upon the scope of the invention except insofar as and to the extent that they are included in the accompanying claims. A number of variations to the present invention will be apparent to those of ordinary skill in the art and these variations will not depart from the spirit and scope of the present invention. The scope of the invention is defined by the appended claims and equivalents thereto.

We claim:

1. An optical mechanism for a camera having a camera aperture, said optical mechanism comprising:
    a. An indexing stage movable between at least two distinct positions;
    b. At least a first fixed diameter apodized aperture mounted on the stage and configured to be aligned with the camera aperture in one of the distinct positions of the indexing stage, and wherein the first fixed diameter apodized aperture is not aligned with the camera aperture in the other of the distinct positions of the indexing stage; and
    c. An actuator for moving the stage between each of said distinct positions.

2. The optical mechanism of claim 1 further including alignment mechanism configured to align the stage in each distinct position.

3. The optical mechanism of claim 1, wherein the actuator is a linear actuator.

4. The optical mechanism of claim 3, wherein the stage is configured for linear movement between each of the distinct positions.

5. The optical mechanism of claim 4, further including an alignment mechanism configured to align the stage in each of the distinct positions and wherein there are two distinct positions for the indexing stage.

6. The optical mechanism of claim 5, wherein there exactly one fixed diameter apodized aperture mounted on the indexing stage.

7. The optical mechanism of claim 6, wherein the optical element provides a resulting F-stop value of the camera of about F2.0 to about F11.0 with the stage in the one of the distinct positions and an F-stop value of the camera aperture in the other of the distinct positions.

8. The optical mechanism of claim 3, wherein the stage is configured for rotary movement between each of the distinct positions.

9. The optical mechanism of claim 8, further including an alignment mechanism configured to align the stage in each of the distinct positions and wherein there is at least two fixed diameter apodized apertures mounted on the indexing stage, each configured to be aligned with the camera aperture with the indexing stage in selected distinct positions.

10. The optical mechanism of claim 9, wherein there are at least three distinct positions for the indexing stage.

11. The optical mechanism of claim 10, wherein there are exactly two fixed diameter apodized apertures mounted on the indexing stage and wherein the optical element provides a resulting F-stop value of the camera of about F/2.0 to about F/4.0 with the stage in the one of the distinct positions, a resulting F-stop value of the camera of about F/4.5 to about F/7.5 with the stage in a second of the distinct positions and an F-stop value of about F/8.0 to about F/11.0 with the camera aperture in the third of the distinct positions.

12. The optical mechanism of claim 3, wherein the actuator is a rotary actuator and the stage is configured for rotary movement between each of the distinct positions.

13. The optical mechanism of claim 12, further including an alignment mechanism configured to align the stage in each of the distinct positions and wherein there is at least two fixed diameter apodized apertures mounted on the indexing stage, each configured to be aligned with the camera aperture with the indexing stage in selected distinct positions.

14. The optical mechanism of claim 13, wherein there are at least three distinct positions for the indexing stage.

15. The optical mechanism of claim 14, wherein there is at least three fixed diameter apodized apertures mounted on the indexing stage, each configured to be aligned with the camera aperture with the indexing stage in selected distinct positions.

16. The optical mechanism of claim 15, wherein there are at least four distinct positions for the indexing stage.

17. The optical mechanism of claim 16, wherein there are exactly three fixed diameter apodized apertures mounted on the indexing stage and wherein the optical element provides a resulting F-stop value of the camera of about F/2.0 to about F/6.0 with the stage in the one of the distinct positions, a resulting F-stop value of the camera of about F/5.5 to about F/8.0 with the stage in a second of the distinct positions, a resulting F-stop value of the camera of about F/8.0 to about F/11.0 with the stage in a third of the distinct positions and an F-stop value of the camera aperture in the fourth of the distinct positions.

18. The optical mechanism of claim 1, wherein each fixed diameter apodized aperture includes dye diffused into an optical substrate.

19. The optical mechanism of claim 1, wherein each fixed diameter apodized aperture includes a clear topcoat.

20. The optical mechanism of claim 1, wherein each fixed diameter apodized aperture is molded with a dye containing optical substrate.

21. A method of making a fixed diameter apodized aperture comprising the steps of:
    a. Providing an optical substrate for the apodized aperture;
    b. Depositing a mask on the substrate;
    c. Depositing a material containing an optical dye onto the substrate; and
    d. Diffusing the optical dye into the optical substrate, wherein the dye will diffuse into the substrate at least partially under the mask when viewed from above the mask and the substrate, forming an apodized aperture.

22. The method of forming a fixed diameter apodized aperture according to claim 21 wherein the effective diameter of the apodized aperture is determined by the effective diameter of the mask and the level of diffusion of step d.

23. The method of forming a fixed diameter apodized aperture according to claim 21 wherein the mask is a substantially circular mask which is generally centered on the apodized aperture.

24. The method of forming a fixed diameter apodized aperture according to claim 23 wherein the mask is an optical clear coat.

25. The method of forming a fixed diameter apodized aperture according to claim 21 wherein the mask forms part of the apodized aperture.

26. The method of forming a fixed diameter apodized aperture according to claim 21 wherein the mask is a substantially circular optical clear coat.

27. The method of forming a fixed diameter apodized aperture according to claim 21 further including a planarizing step.

28. The method of forming a fixed diameter apodized aperture according to claim 27, wherein the planarizing step includes the at least partial removal of the mask.

29. The method of forming a fixed diameter apodized aperture according to claim 27, wherein the planarizing step includes the addition of a planarizing layer.

30. The method of forming a fixed diameter apodized aperture according to claim 21, wherein a plurality of masks are applied to a single optical substrate for simultaneously forming multiple apertures.

31. The method of forming a fixed diameter apodized aperture according to claim 21 wherein the optical substrate is formed from a material selected from the group of UV curable, Thermally curable, thermoplastics.

32. The method of forming a fixed diameter apodized aperture according to claim 21 wherein the dye is formed from a material that absorbs light from 325 to 850 nm.

33. A method of making a fixed diameter apodized aperture comprising the steps of:
    a. Providing an clear optical substrate for the apodized aperture,
    b. Providing an dye containing optical substrate for the apodized aperture surrounding the clear optical substrate for the apodized aperture;
    c. Diffusing the optical dye from the dye containing optical substrate into the clear optical substrate forming an apodized aperture.

34. The method of forming a fixed diameter apodized aperture according to claim 33 wherein the effective diameter of the apodized aperture is determined by the effective diameter of the clear optical substrate and the level of diffusion of step c.

35. The method of forming a fixed diameter apodized aperture according to claim 34 wherein the clear optical substrate is substantially circular and is generally centered on the apodized aperture.

36. The method of forming a fixed diameter apodized aperture according to claim 33 wherein the clear optical substrate is substantially circular and is generally centered on the apodized aperture.

37. The method of forming a fixed diameter apodized aperture according to claim 33 further including planarizing step.

38. The method of forming a fixed diameter apodized aperture according to claim 33, wherein multiple apertures are simultaneously formed.

39. The method of forming a fixed diameter apodized aperture according to claim 38 further including a planarizing step.

40. A method of making a fixed diameter apodized aperture comprising the steps of:
    a. Providing an clear optical substrate for the apodized aperture having radially outwardly diverging sides from the top of the clear optical substrate to the bottom thereof, b. casting an dye containing optical substrate for the apodized aperture surrounding the clear diverging side optical substrate for the apodized aperture.

41. The method of forming a fixed diameter apodized aperture according to claim 40 wherein the effective diameter of the apodized aperture is determined by the effective diameter of the clear optical substrate and the shape of the diverging sides.

42. The method of forming a fixed diameter apodized aperture according to claim 41 wherein the clear optical substrate is substantially circular and is generally centered on the apodized aperture.

43. The method of forming a fixed diameter apodized aperture according to claim 40 wherein the clear optical substrate is substantially circular and is generally centered on the apodized aperture.

44. The method of forming a fixed diameter apodized aperture according to claim 40 further including a planarizing step.

45. The method of forming a fixed diameter apodized aperture according to claim 40, wherein multiple apertures are simultaneously formed.

46. The method of forming a fixed diameter apodized aperture according to claim 45 further including a planarizing step.

47. A method of making a fixed diameter apodized aperture comprising the steps of:
   a. Providing an clear optical substrate for the apodized aperture,
   b. Providing an dye containing optical substrate for the apodized aperture surrounding the clear optical substrate for the apodized aperture; and
   c. Simultaneously providing the clear optical substrate and the dye containing optical substrate in a manner allowing for diffusing the optical dye from the dye containing optical substrate into the clear optical substrate forming an apodized aperture.

48. The method of forming a fixed diameter apodized aperture according to claim 47 wherein the effective diameter of the apodized aperture is determined by the effective diameter of the clear optical substrate and the level of diffusion of step c.

49. The method of forming a fixed diameter apodized aperture according to claim 47 wherein the clear optical substrate is substantially circular and is generally centered on the apodized aperture.

50. The method of forming a fixed diameter apodized aperture according to claim 47 wherein a pair of movable print heads are used for dispensing the dye containing optical substrate and the clear optical substrate.

51. The method of forming a fixed diameter apodized aperture according to claim 47 wherein a pair of concentric dispensing nozzles are used for dispensing the dye containing optical substrate and the clear optical substrate.

52. The method of forming a fixed diameter apodized aperture according to claim 47 wherein the providing of the clear optical substrate and the dye containing optical substrate is in an injection molding operation.

* * * * *

UNITED STATES PATENT AND TRADEMARK OFFICE
CERTIFICATE OF CORRECTION

| | | |
|---|---|---|
| PATENT NO. | : 8,734,033 B2 | Page 1 of 1 |
| APPLICATION NO. | : 13/792442 | |
| DATED | : May 27, 2014 | |
| INVENTOR(S) | : Robert W. Walters et al. | |

It is certified that error appears in the above-identified patent and that said Letters Patent is hereby corrected as shown below:

In the Claims

Column 14, Line 53, Claim 6, after "there" insert -- is --

Column 16, Line 55, Claim 37, after "including" insert -- a --

Signed and Sealed this
Thirtieth Day of September, 2014

Michelle K. Lee
*Deputy Director of the United States Patent and Trademark Office*